(12) United States Patent
Michon et al.

(10) Patent No.: US 6,718,765 B2
(45) Date of Patent: Apr. 13, 2004

(54) BRAKE BOOSTER DEVICE, WITH IMPROVED OPERATING CONDITIONS, FOR MOTOR VEHICLE

(75) Inventors: Jean-Pierre Michon, Saint-Pathus (FR); Stéphane Lacroix, Tournan en Brie (FR)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 10/111,019

(22) PCT Filed: Nov. 21, 2001

(86) PCT No.: PCT/FR01/03655
§ 371 (c)(1),
(2), (4) Date: Apr. 19, 2002

(87) PCT Pub. No.: WO02/42140
PCT Pub. Date: May 30, 2002

(65) Prior Publication Data
US 2003/0038004 A1 Feb. 27, 2003

(30) Foreign Application Priority Data
Nov. 24, 2000 (FR) .............................................. 00 15304

(51) Int. Cl.⁷ .............................................. B60T 13/573
(52) U.S. Cl. .......................................... 60/553; 60/562
(58) Field of Search ........................ 60/552, 553, 574, 60/562

(56) References Cited
U.S. PATENT DOCUMENTS 5,921,084 A * 7/1999 Gautier et al. ................ 60/553
5,934,075 A * 8/1999 Castel et al. ................... 60/552
5,941,071 A * 8/1999 Simon Bacardit ............ 60/553
6,082,109 A * 7/2000 Simon Bacardit ............ 60/553
6,085,522 A * 7/2000 Simon Bacardit ............ 60/553

FOREIGN PATENT DOCUMENTS

| DE | 4429439 A1 | * | 2/1996 | ......... B60T/13/573 |
| FR | 2658466 A1 | * | 8/1991 | ......... B60T/13/565 |
| FR | 2724354 A1 | * | 3/1996 | ........... B60T/13/56 |
| FR | 2784953 A1 | * | 4/2000 | ........... B60T/13/20 |

* cited by examiner

*Primary Examiner*—Edward K. Look
*Assistant Examiner*—Thomas E. Lazo
(74) *Attorney, Agent, or Firm*—Leo H McCormick, Jr.; Warren Comstock

(57) ABSTRACT

A braking device comprising a master cylinder (2), a primary piston (3), a manual control member (4), a booster (6) coupled to the manual control member (4) and an emergency assist valve (VA). The emergency assist valve comprising a reaction piston (17) through which there passes a ratio control (T) having a head (26a) situated in a chamber (35) lying between the reaction piston (17) and a bushing (36) located further forward in a bore (18) in the primary piston. The bushing (36) has a bore (37) in which there can slide a rapid piston (38), the rear end (45) of which forms, with the head (26a) of the ratio control, a valve (C). The valve (C) is capable of closing the inlet to a passage (39) in the rapid piston against the action of a spring (41). The braking device comprises a means (26, 27, 30) for preventing a sharp retreat of the reaction piston (17) when the manual control member (4) is released after slow braking.

17 Claims, 2 Drawing Sheets ered by a booster which is coupled to the manual control
BRAKE BOOSTER DEVICE, WITH IMPROVED OPERATING CONDITIONS, FOR MOTOR VEHICLE The invention relates to a boosted braking device for a motor vehicle, of the type which comprise a master cylinder controlling the pressure in at least one braking circuit, a primary piston mounted to slide in the master cylinder to create a pressure variation therein, this primary piston being subjected to an actuating force made up of an input force exerted by a manual control member and a boost force exerted by a booster which is coupled to the manual control member.

BACKGROUND OF THE INVENTION

The booster may be pneumatic and comprise a rigid casing divided into two pneumatic chambers by a moving partition which can be subjected to a difference in pressure between the chambers under the action of a valve operated by the manual control member.

A braking device of this type is known, for example from EP-B-0 662 894.

The conditions under which braking is afforded may differ. A first scenario corresponds to ordinary conditions when an obstacle is seen from afar and braking is exerted relatively gently; this braking is known as "slow braking". Another scenario is that of sharp braking or "emergency braking", for example when an obstacle suddenly appears in front of the driver who has to bring his vehicle to rest as quickly as possible.

In order to satisfy these various braking conditions, a boosted braking device, of the type defined hereinabove, has been supplemented by an emergency assist valve capable of initiating the intervention of at least two boost ratios corresponding respectively to slow braking and to emergency braking; the boost ratio of the slow braking is lower and the reaction opposing the advancement of the manual control member is greater. In the case of emergency braking, the boost ratio is higher and the reaction against the manual control member is lower, which means that the river can brake for longer and more heavily.

SUMMARY OF THE INVENTION

By convention, the term "front" will be used in the remainder of the text to mean a direction directed from the control member toward the master cylinder, and the term "rear" or "back" will be used to denote the opposite direction.

The emergency assist valve comprises a reaction piston which slides in sealed manner at the rear of a bore of the primary piston, the front part of this bore communicating with the interior volume of the master cylinder, the reaction piston having an axial passage through which there passes a ratio control pushed by a plunger itself driven by the manual control member, the ratio control at its front end comprising a head situated in a chamber lying between the reaction piston and a bushing arranged further forward in the bore of the primary piston, this bushing having a bore in which a rapid piston of smaller cross section than the reaction piston can slide, which rapid piston also has a passage open at each end, the rear end of the rapid piston and the head of the ratio control forming a valve capable of closing the inlet to the passage in the rapid piston against the action of a spring which tends to open the valve.

The slow boost ratio calls on the intervention of the reaction piston, of larger section; emergency braking calls on the intervention of the rapid piston, of smaller section.

It has become apparent that such a braking device, with an emergency assist valve, while proving entirely satisfactory from the operational and braking force points of view, gives rise to noise when the manual control member is released.

An object of the invention, above all, is to provide a braking device of the type defined hereinabove, equipped with an emergency assist valve, in which the aforementioned disadvantage no longer occurs or, at the very least, occurs only to a lesser extent.

It is furthermore desirable for the proposed solution to remain simple and economical.

In order to solve the problem, the inventors had to find the source of the noise in question. The inventors were able to determine that this noise was produced when the manual control member was released after slow braking beyond the maximum boost force that the booster can provide, that is to say beyond the "saturation" point, and that it was due to impact of the reaction piston against the plunger.

In order to avoid such noise, according to the invention, a boosted braking device for a motor vehicle, equipped with an emergency assist valve, of the type defined hereinabove, is characterized in that it comprises a means for preventing a sharp retreat of the reaction piston when the manual control member is released after slow braking.

The impact of the reaction piston against the plunger is thus reduced or even eliminated, as is the accompanying noise. In addition, the parts are less heavily stressed and their life is increased.

As a preference, the means for preventing a sharp retreat of the reaction piston is capable of limiting an increase in pressure in the chamber lying between the reaction piston and the bushing when the manual control member is released.

In particular, the means for preventing the sharp retreat of the reaction piston is capable of keeping the valve closed while the manual control member is being released, and of preventing a rise in pressure in the said chamber.

The means capable of keeping the valve closed may comprise a hydraulic circuit for applying the pressure obtaining in the master cylinder to a rear part of the ratio control so as to exert a force keeping the valve closed. The cross section of the rear part of the ratio control on which the pressure is exerted is greater than the cross section for closure of the valve.

Advantageously, the ratio control is made of two separate elements, a first element located forward comprising the head of the ratio control and, to the rear of the head, a part of smaller cross section mounted to slide in sealed manner in a housing in the reaction piston, this first element having a duct passing through it along its entire length, and a second element, situated to the rear of the first, of solid cross section, also mounted to slide in sealed manner in a bore in the reaction piston, this second element closing the housing in which the first element is mounted and transmitting loads between the first element and the plunger. The second element may be held in the housing of the first element by an elastic snap ring anchored in a groove in the second element.

The head of the ratio control provided at the front end of the first element may have a convex frustoconical shape projecting forward, and be fitted with an O-ring determining a diameter of the sealing zone which is smaller than the outside diameter of the rear part of this first element; the facing end of the rapid piston has a frustoconical surface which is concave toward the rear and against which the head of the first element comes to bear.

The bushing may be axially immobilized in the bore.

Apart from the provisions explained hereinabove, the invention consists of a certain number of other provisions which will be dealt with more fully hereinafter with regard to an exemplary embodiment described in detail with reference to the appended drawings.

DETAILED DESCRIPTION OF THE INVENTION

The overall structure and general operation of a boosted braking device of the type of the invention are known, particularly from patents EP-B-0 662 894 or FR-B-2 658 466, and only a brief reminder thereof will be given. For further details, reference may be made to the two aforementioned patents.

Figure 1:
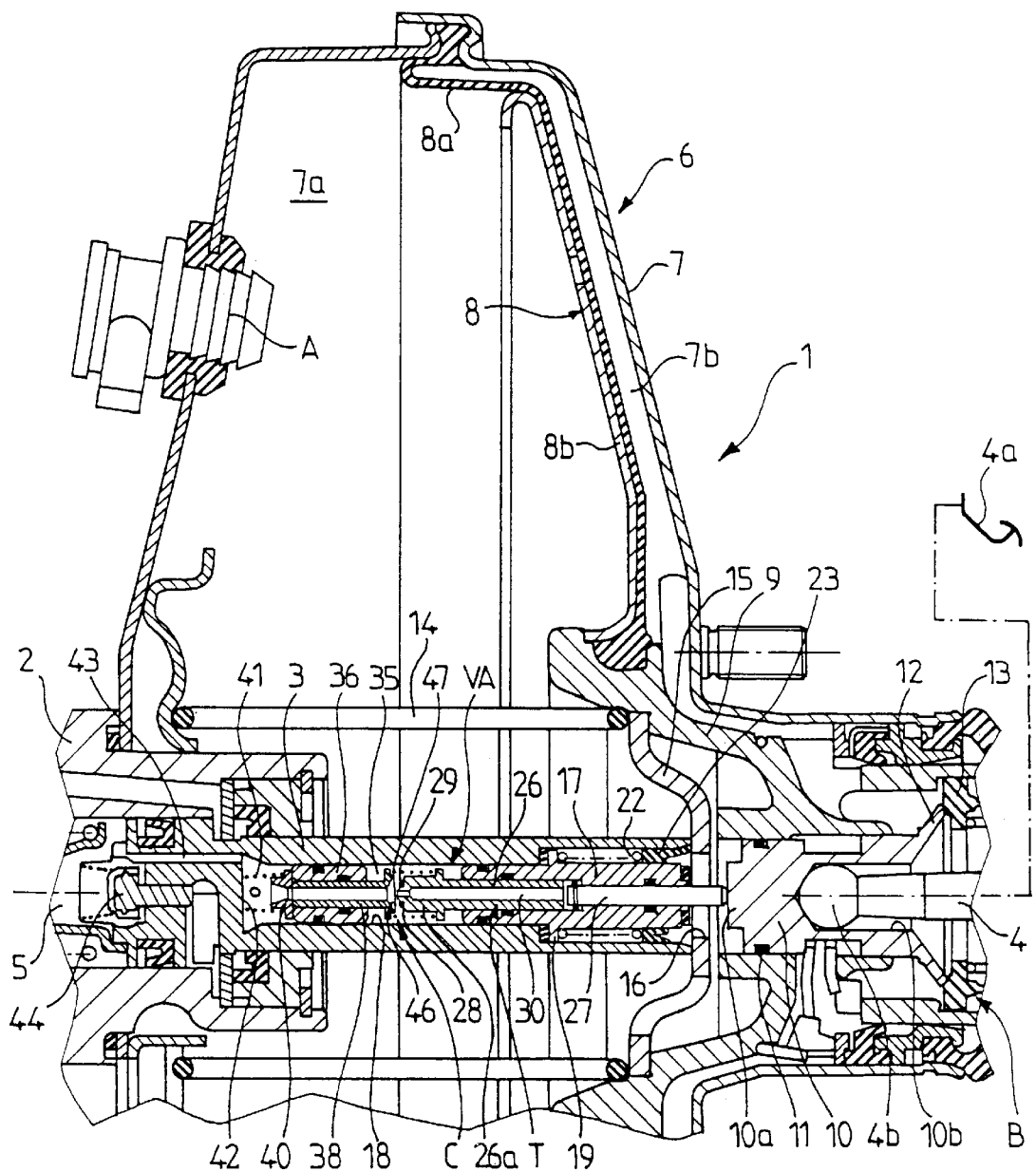
FIG. 1 is a part view in section with partial cutaway of a braking device according to the invention.

FIG. 1 shows a braking device 1 for a motor vehicle which comprises a master cylinder 2, depicted in part, and a primary piston 3 mounted to slide in the master cylinder 2. A manual control member 4 comprising a linkage coaxial with the primary piston 3 is designed to exert on this piston an input force from back to front, that is to say from right to left in the depiction of FIG. 1. The forward displacement of the primary piston 3 creates an increase in pressure of the liquid in the interior volume 5 of the master cylinder 2, connected to at least one hydraulic braking circuit. The control member 4 is generally actuated by a brake pedal 4a, depicted schematically.

A pneumatic booster 6 is coupled to the control member 4. The booster 6 comprises a rigid casing 7 divided internally in sealed manner into two pneumatic chambers 7a, 7b by a moving partition 8 comprising a diaphragm 8a made of elastomer and a rigid skirt 8b. The chamber 7a is connected permanently to a source of partial vacuum (not depicted) by a nozzle A. A pneumatic piston 9 in the form of a sleeve coaxial with the primary piston 3 is fixed to the rigid skirt 8b. The pneumatic piston 9 is mounted to slide, in sealed manner, on a plunger distributor 10 in the form of a cylindrical core. Sealing is afforded by an O-ring 11. The plunger 10 comprises, toward the front, a smaller-diameter extension 10a and, toward the rear, a blind axial housing 10b, open toward the rear, that accommodates a bore end 4b provided at the end of the linkage 4.

On the opposite side to the piston 3, the plunger 10 has a frustoconical widening 12 which can bear in sealed manner against an elastomer ring 13 connected in terms of axial translation to the pneumatic piston 9. The assembly 12, 13 constitutes part of a three-way valve B (partially depicted) which either allows the chamber 7b to be isolated from the atmosphere and the chambers 7a, 7b to be placed in communication, or allows the chambers 7a, 7b to be isolated from one another and air at atmospheric pressure to be let into the chamber 7b when the widening 12. moves axially away from the ring 13.

The pneumatic piston 9 is returned toward its position of rest, depicted in FIG. 1, by a compression spring 14 placed between the piston 9 and the wall opposite the casing 7 to which the master cylinder 2 is fixed. A cup 15 with a central opening 16 bears axially via its exterior peripheral edge against a shoulder of the pneumatic piston 9. The spring 14 presses the edge of this cup against the piston 9. The cup 15 bears axially, via the interior edge surrounding its opening 16, against the rear end of the primary piston 3. The extension 10a of the plunger 10 can pass freely through the opening 16.

An emergency assist valve VA is provided to initiate the intervention of at least two boost ratios corresponding respectively to slow braking and to emergency braking.

Figure 2:
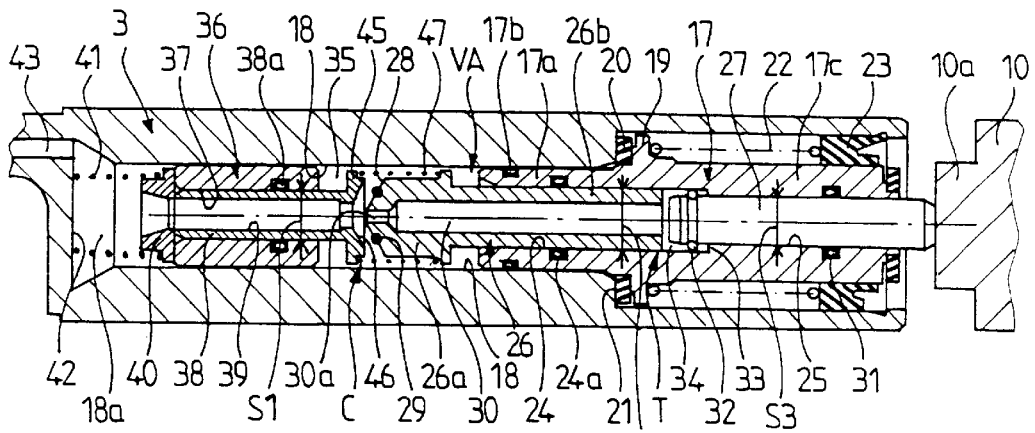
FIG. 2 is a part view in section, on a larger scale, of elements of FIG. 1 and of the emergency assist valve, the braking device being in the position of rest.

The valve VA comprises a reaction piston 17, of which a smaller-diameter front part 17a (FIG. 2) slides in sealed manner, by virtue of an O-ring 17b, in an axial bore 18 in the primary piston 3. The rear part 17c of the reaction piston has a greater diameter and has a flange 19 which can slide in a larger-diameter rear zone of the bore 18 in the primary piston 3. A ring 20 made of elastomer is placed against the flange 19, on the same side as the part 17a. This ring 20 can come to bear axially against a shoulder 21 of the primary piston 3. On the other side, the flange 19 acts as an axial thrust face for a preloaded helical compression spring 22 known as the jump spring. At its other, rear, end, the spring 22 bears against a clip-in ring 23 made of plastic, anchored to the primary piston 3 and in which the rear part 17c of the reaction piston slides.

The reaction piston 17 has passing axially through it a passage formed of two coaxial successive bores 24, 25 of different diameters. The further-forward bore 24 has a larger diameter than the rear bore 25, and forms a housing.

A ratio control T is made of two successive separate elements 26, 27 and is mounted in the piston 17.

The first element 26, situated forward, comprises, at its front end, a head 26a of larger diameter than the bore 24. The part 26b of the element 26 located to the rear of the head 26a, has a smaller diameter and a cross section S2 corresponding to that of the bore 24. This part 26b can slide in sealed manner in the bore 24 by virtue of an O-ring 24a housed in a groove in the bore. The front end of the head 26a has a convex frustoconical surface 28 projecting forward and in which there is a groove centered on the axis, of a diameter smaller than the outside diameter of the head 26a, fitted with an O-ring 29. Passing through the element 26 is an axial duct 30, the front end 30a of which has a small diameter.

The rear element 27 of the ratio control T is independent of the front element 26. The element 27, of section S3, has the same diameter as the bore 25 in which it can slide in sealed manner by virtue of an O-ring 31 housed in a groove in the bore 25. The front end of the element 27 projects into the bore 24 and is equipped with an elastic snap ring 32, that is to say an open ring, housed in a groove in the element 27. This snap ring 32 is capable of acting as a stop against the shoulder 33 marking the transition between the bore 24 and the bore 25, to hold the element 27 in the piston 17. The front end of the element 27 is in a space 34 lying between the rear end of the element 26 and the shoulder 33. The rear end of the element 27 bears against the extension 10a of the plunger 10. The element 27 transmits reaction loadings created by the pressure on the section S3, against the plunger 10.

The head 26a of the first element 26 lies in a chamber 35 of the bore 18 lying between the reaction piston 17 and a bushing 36 housed further forward in the bore 18. The bushing 36 is axially immobilized relative to the primary piston 3 by press-fitting or by anchoring tabs.

The bushing 36 has an axial bore 37 passing completely through it and in which a rapid piston 38, of external section Sl, is mounted to slide in sealed manner by virtue of an O-ring 38a. The outside diameter of the rapid piston 38 is smaller than that of the front part 17a of the reaction piston. The rapid piston 38 has, passing axially through it, a passage 39 which is open at each end. The front end of the rapid piston 38 bears against a ring 40 pushed by a spring 41 against the bushing 36. The spring 41 bears, at the other end, against an end wall 42 located at the front of the bore 18. The front zone 18a of the bore 18, in which zone the spring 41 is housed, communicates via a duct 43 with the interior volume 5 of the master cylinder 2. The spring 41 is subjected to a preload lower than that of the spring 22. A valve 44 (FIG. 1) is also provided so that when the volume 5 is no longer under pressure, this volume can be resupplied with liquid from a reservoir (not depicted).

The rear end 45 of the rapid piston 38 is located in the chamber 35 and is in the form of a disk of a diameter greater than that of the bore 37. This end 45 has a frustoconical recess 46, the concave side of which faces toward the rear, so as to collaborate with the frustoconical surface 28 and the O-ring 29 of the head 26a. A valve C is thus formed by the head 26a and the disk 45 which, when bearing together axially, cut off the communication between the chamber 35 and the passage 39 in the moving piston 38. The cross section for closure of the valve C is equivalent to the cross section S3 of the element 27 of the ratio control.

A coaxial compression spring 47 is placed between two shoulders provided respectively on the head 26a and on the rear end 45. This spring 47 has a tendency to cause the end 45 and the head 26a to move apart in order to open the valve C.

The "saturation" point of the braking device is reached when the boost force that the booster 6 can provide reaches its maximum, that is to say when the pressure difference to which the partition 8 is subjected can no longer increase.

When this happens, operation of the braking device when the brake pedal is released after slow braking and after saturation has been exceeded is as follows.

There follows a reminder of what is involved in slow braking. The manual control member 4 is moved to the left by depressing the pedal 4a. The valve B is actuated and cuts off the communication between the chambers 7a and 7b, then the frustoconical widening 12 moves away from the ring 13, which allows air at atmospheric pressure into the chamber 7b of the booster 6. The moving partition 8 transmits the boost force to the pneumatic piston 9 which moves forward against the spring 14. The piston 9 drives the cup 15 which pushes the primary piston 3 forward. The plunger 10 also moves forward and, via its extension 10a, pushes the element 27 which via its front end comes into abutment against the rear end of the element 26 which is therefore pushed by the element 27. The primary piston 3 and the assembly 26–27 forming the ratio control T move forward, the valve C remaining open.

The pressure of the liquid in the volume 5 increases because of the entry of the primary piston 3 into the master cylinder 2. This increase in pressure is transmitted to the chamber 35, the valve C being open. The pressure generates on the reaction piston 17, a backward load. When this load reaches and exceeds the preload of the spring 22, the reaction piston 17 retreats until it comes into abutment against the extension 10a, which corresponds to the phase known as the "jump".

In this configuration (not depicted in the drawings), the shoulder 19 and the ring 20 lie some distance back from the shoulder 21.

Under the action of the input force on the member 4, the plunger 10 continues its forward movement; the pneumatic piston 9 follows the plunger 10 and pushes the primary piston 3 with the boost force. The pressure of the liquid in the volume 5 continues to increase, as it does in the chamber 35.

When the difference in pressure between the chambers 7b and 7a of the booster 6 reaches its maximum value, the booster 6 produces its maximum load which corresponds to "saturation". An increase in the braking effort can then be obtained only by increasing the input force on the member 4. The primary piston 3 remains stationary for a brief period because the force exerted backward by the pressure of the liquid on this piston 3 balances the boost force of the booster 6.

Figure 3:
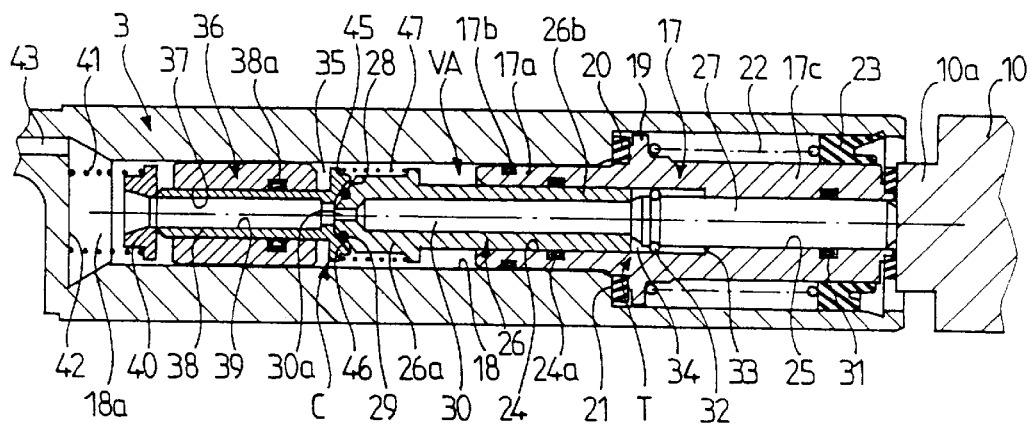
FIG. 3 shows, in a similar way to FIG. 2, the elements during slow braking after saturation.

As the control member 4 continues to advance under the action of the manual force, the ratio control T advances relative to the primary piston 3. The element 27 pushes the element 26 in such a way that the head 26a presses in sealed manner via its seal 29 against the seat 46. The valve C is then closed. The rapid piston 38 is pressed forward by the head 26a, and itself pushes on the ring 40 which moves away from the bushing 36, against the action of the spring 41. The reaction piston 17, pushed by the plunger 10 against which it bears, also advances relative to the primary piston 3 until the ring 20 comes into abutment with the shoulder 21 as illustrated in FIG. 3. The input force on the control member 4 makes it possible, via the reaction piston 17, for the primary piston 3 to be driven and for the braking pressure to be increased beyond the saturation point.

Following this phase of slow braking beyond the saturation point, when the brake pedal 4a is released, the control member 4 and the plunger 10 retreat, that is to say move to the right according to the depiction in the drawings, under the action of the hydraulic pressure. The primary piston 3 also retreats, but the movements of the piston 3 are not depicted in FIGS. 2 to 4, for reasons of simplification.

Figure 4:
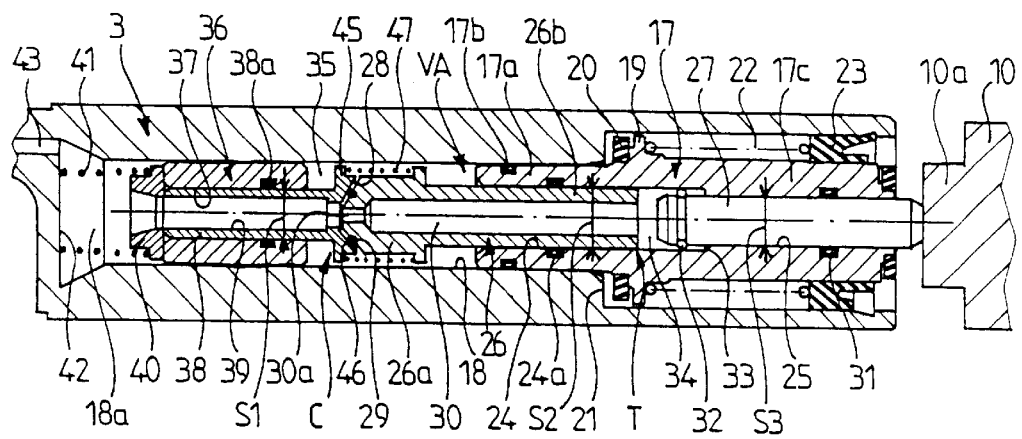
FIG. 4 shows, in a similar way to FIG. 2, the elements of the emergency valve when the brake pedal has been released following the phase illustrated by FIG. 3.

The rapid piston 38, which had advanced with respect to the bushing 36, follows the retreating movement (see FIG. 4), as does the element 26 under the effect of the pressure obtaining in the chamber 41 and which is applied to the cross section Sl of the rapid piston 38. The reaction piston 17 experiences a small backward displacement, under the effect of the residual pressure trapped in the chamber 35, as far as a position in which the effect of this residual pressure and the force of the spring 22 reach equilibrium; the rear end of the piston 17 breaks contact with the extension 10a of the plunger 10, which retreats further than the piston 17 (FIG. 4).

The pressure in the master cylinder and in the chamber 41 decreases as the primary piston 3 moves backward. However, the pressure in the chamber 41 remains higher than the pressure obtaining in the chamber 35 which is isolated by the closed valve C.

Beyond a certain value of the pressure in the chamber 41, higher than the pressure in the chamber 35, the force of the spring 47 of the valve C becomes predominant and could open the valve C in the absence of the arrangement of the invention. Such opening would give rise to a sharp increase in pressure in the chamber 35 and to a sharp retreat of the reaction piston 17, which would collide with the extension 10a of the plunger 10, with impact noise.

The arrangement of the invention makes it possible to avoid this noise.

What happens is that the pressure obtaining in the chamber 41 is transmitted by the passages 39 and 30 to the space 34. The application of this pressure to the rear of the element 26 over the section S2 which is greater than the section for closure of the valve C makes it possible to counter the force of the spring 47 and to keep the valve C closed until the pressure in the chamber 41 has dropped to a relatively low value.

When the valve C does open, the pressure in the chamber 41, transmitted to the chamber 35, is low and the reaction piston 17 is not driven back violently against the plunger 10. The value of this pressure may even be low enough for the force created on the piston 17 not to be higher than that of the spring 22, so that the piston 17 is not pushed back.

Thus, the means formed by the elements 26, 27, the passage 30 and the space 34, prevents a sharp retreat of the reaction piston 17, while limiting the increase in pressure in the chamber 35. The protection claimed of course encompasses any means equivalent to the one described.

We claim:

1. A boosted braking device for a motor vehicle, comprising a master cylinder controlling the pressure in at least one braking circuit, a primary piston mounted to slide in the master cylinder to create a pressure variation therein, said primary piston being subjected to an actuating force made up of an input force exerted by a manual control member and a boost force exerted by a booster which is coupled to the manual control member and an emergency assist valve which comprises a reaction piston sliding in sealed manner at the rear of a first bore of the primary piston, said first bore having a front part in communication with the interior volume of the master cylinder, said reaction piston having an axial passage through which there passes a ratio control pushed by a plunger said, plunger being itself driven by the manual control member, the said ratio control at its front end comprising a head situated in a chamber lying between the reaction piston and a bushing arranged further forward in the first bore of the said primary piston, said bushing having a second bore in which a rapid piston of smaller cross section than the reaction piston can slide, said rapid piston also has a passage open at each end, a rear end of said rapid piston and a head of said ratio control forming a valve capable of closing the inlet to the passage in the rapid piston against the action of a spring which tends to open the valve, said boosted braking device being characterized by means for preventing a sharp retreat of the reaction piston when the manual control member is released after slow braking.

2. The braking device according to claim 1, characterized in that said means for preventing a sharp retreat of the reaction piston is capable of limiting an increase in pressure in the chamber lying between the reaction piston and the bushing when the manual control member is released, by keeping the valve closed until the pressure in the chamber has dropped to a relatively low value.

3. The braking device according to claim 2, characterized in that said means capable of keeping the valve closed comprises a hydraulic circuit for applying the pressure obtaining in the master cylinder to a rear part said ratio control so as to exert a force keeping the valve closed.

4. The braking device according to claim 3, characterized in that the cross section of the rear part of the ratio control on which the pressure is exerted is greater than the cross section for closure of the valve.

5. The braking device according to claim 4, characterized in that said ratio control is made of two separate elements, a first element located forward comprising the head of said ratio control and, to the rear of said head, a part having a smaller cross section mounted to slide in sealed manner in a housing in said reaction piston, said first element having a duct passing through it along its entire length, and a second element situated to the rear of said first element, said second element having a solid cross section that is mounted to slide in sealed manner in said passage in said passage reaction piston, said second element closing the housing in which said first element is mounted and transmitting loads between said first element and said plunger.

6. The braking device according to claim 5, characterized in that said second element is held in the housing of said first element by a snap ring anchored in a groove in said second element.

7. The braking device according to claim 6, characterized in that said head of ratio control provided at the front end of said first element has a convex frustoconical shape projecting forward, and is fitted with an O-ring determining a diameter of the sealing zone which is smaller than the outside diameter of said rear part of said first element.

8. The braking device according to claim 5, characterized in that said head of said ratio control provided at the front end of said first element has a convex frustoconical shape projecting forward, and is fitted with an O-ring determining a diameter of the sealing zone which is smaller than the outside diameter of the rear part of said first element.

9. The braking device according to claim 8, characterized in that said end of the said rapid piston facing the head has a frustoconical surface which is concave toward said rear and against which said head of said first element can come to bear.

10. The braking device according to claim 3, characterized in that said ratio control is made of two separate elements a first element located forward comprising the head of said ratio control and, to the rear of the said head, a part of smaller cross section mounted to slide in sealed manner in a housing in said reaction piston, said first element having a duct that passes through it along its entire length, and a second element situated to the rear of said first element, having a solid cross section, that is mounted to slide in sealed manner in said passage in said reaction piston, said second element closing the housing in which said first element is mounted and transmitting loads between said first element and the said plunger.

11. The braking device according to claim 10, characterized in that said second element is held in the housing of said first element by a snap ring anchored in a groove in said second element.

12. The braking device according to claim 11 characterized in that said head of said ratio control provided at the front end of said first element has a convex frustoconical shape projecting forward, and is fitted with an O-ring determining a diameter of the sealing zone which is smaller than the outside diameter of the rear part of said first element.

13. The braking device according to claim 12, characterized in that said end of said rapid piston facing the head has a frustoconical surface which is concave toward said rear and against which said head of said first element can come to bear.

14. The braking device according to claim 12, characterized in that said end of said rapid piston facing the head has a frustoconical surface which is concave toward said rear and against which said head of said first element can come to bear.

15. The braking device according to claim 10, characterized in that said head of said ratio control provided at the front end of the first element has a convex frustoconical shape projecting forward, and is fitted with an O-ring determining a diameter of the sealing zone which is smaller than the outside diameter of the rear part of said first element.

16. The braking device according to claim 15, characterized in that said end of said rapid piston facing said head has a frustoconical surface which is concave toward said rear and against which said head of said first element can come to bear.

17. The braking device according to claim 1 characterized in that said bushing is axially immobilized in said first bore.

* * * * *